(12) United States Patent
Lwali et al.

(10) Patent No.: US 11,091,182 B1
(45) Date of Patent: Aug. 17, 2021

(54) MULTI-SURFACE CART

(71) Applicant: Amazon Technologies, Inc., Seattle, WA (US)

(72) Inventors: Racha Lwali, Seattle, WA (US); Ruolan Wang, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 2 days.

(21) Appl. No.: 16/518,569

(22) Filed: Jul. 22, 2019

(51) Int. Cl.
B62B 3/02 (2006.01)

(52) U.S. Cl.
CPC ............ *B62B 3/02* (2013.01); *B60G 2500/30* (2013.01); *B62B 2206/003* (2013.01); *B62B 2206/006* (2013.01); *B62B 2206/06* (2013.01)

(58) Field of Classification Search
CPC ........ B62B 2206/003; B62B 2206/006; B62B 2206/06; B62B 3/02; B60G 2500/30
See application file for complete search history.

(56) References Cited

U.S. PATENT DOCUMENTS

| | | | | |
|---|---|---|---|---|
| 2,917,317 A * | 12/1959 | Denholm | ................... | B62B 3/02 280/43.24 |
| 3,810,649 A * | 5/1974 | Fahey, Jr. | ............... | A45C 5/146 280/37 |
| 4,122,924 A * | 10/1978 | Wasserman | ............ | A45C 5/146 190/18 A |
| 4,420,168 A * | 12/1983 | Dewing | ................... | B62B 3/104 220/908 |
| 4,989,888 A * | 2/1991 | Qureshi | ............... | B60N 2/2848 280/30 |
| 5,149,113 A * | 9/1992 | Alldredge | ................. | B62B 7/12 280/30 |
| 5,551,715 A * | 9/1996 | Pickard | ................... | B60B 33/06 188/5 |
| 8,360,443 B2 * | 1/2013 | Ellington | ................... | B66F 9/06 280/43.12 |
| 8,511,693 B2 * | 8/2013 | Gass | ....................... | B25H 1/04 280/43.17 |
| 8,632,045 B2 * | 1/2014 | Ma | ........................ | A45B 23/00 248/519 |
| 8,678,403 B1 * | 3/2014 | McCleave | ................ | G10H 1/32 280/35 |
| 9,045,253 B2 * | 6/2015 | Hacko | ................... | B62B 5/0433 |
| 9,321,471 B1 * | 4/2016 | Gedeon-Janvier | ........ | B62B 3/02 |
| 9,688,298 B1 * | 6/2017 | Su | ............................. | B62B 1/12 |
| 10,182,633 B1 * | 1/2019 | Giovanni | ............... | A45C 3/001 |
| 10,220,868 B1 * | 3/2019 | Clos | ........................ | B64F 1/322 |
| 10,427,558 B1 * | 10/2019 | Dickens | ............... | B60N 2/2848 |
| 10,696,316 B1 * | 6/2020 | Parks | .................... | B62D 51/04 |

(Continued)

*Primary Examiner* — Erez Gurari
(74) *Attorney, Agent, or Firm* — Thomas | Horstemeyer, LLP (57) ABSTRACT

Disclosed are various embodiments for a multi-surface cart that can be modified or configured to move along different underlying surfaces. The cart can include a transport unit and an adjustable base unit that extends below a bottom surface of the transport unit. The adjustable base unit can be adjusted such that the cart is movable along a first surface in a first configuration with a plurality of wheels on the first surface and is moveable along a second surface in a second configuration with an underlying panel of the adjustable base unit on the second surface.

20 Claims, 6 Drawing Sheets

(56) References Cited

U.S. PATENT DOCUMENTS

| | | | |
|---|---|---|---|
| 2005/0110231 A1* | 5/2005 | Brown | B62B 3/027 |
| | | | 280/47.26 |
| 2005/0173878 A1* | 8/2005 | Espejo | B62B 3/027 |
| | | | 280/47.34 |
| 2012/0013083 A1* | 1/2012 | Pendl | B62D 63/064 |
| | | | 280/7.14 |
| 2014/0265255 A1* | 9/2014 | Wang | B60N 2/2848 |
| | | | 280/643 |
| 2018/0319212 A1* | 11/2018 | Lindgren | B60B 30/02 |
| 2019/0077212 A1* | 3/2019 | Imaoka | B60G 17/01908 |
| 2019/0367067 A1* | 12/2019 | Mazzolini | A45C 5/146 |
| 2020/0370998 A1* | 11/2020 | Amacker | B60G 17/00 |

* cited by examiner

MULTI-SURFACE CART

BACKGROUND

At materials handling facilities, various items, articles, products, or packages may be organized for shipment to other locations. A variety of tasks may be performed in various types of materials handling facilities including, such as receiving shipments of new inventory, storing new inventory in storage locations, picking items from the inventory storage locations in response to receiving orders, grouping the picked items, packing the items, readying the packed items for shipment, and sorting the packed items according to a final destination. As packages containing, for example, inventory and/or pre-packaged customer orders are received at materials handling facilities, the packages can be transported to various locations within the facility prior to delivery to another destination.

BRIEF DESCRIPTION OF THE DRAWINGS

Many aspects of the present disclosure can be better understood with reference to the following drawings. The components in the drawings are not necessarily drawn to scale, emphasis instead being placed upon clearly illustrating the principles of the disclosure. Moreover, in the drawings, like reference numerals designate corresponding parts throughout the several views.

FIGS. 2A-2B are perspective views of the multi-surface cart of FIG. 1 according to various embodiments of the present disclosure.

FIGS. 3A-3B are side views of the multi-surface cart of FIG. 1 according to various embodiments of the present disclosure.

FIGS. 4A and 4B are views of a portion of an example base unit of the multi-surface cart of FIGS. 1-3B in the wheels-down configuration according to various embodiments of the present disclosure.

FIGS. 5A and 5B are views of a portion of the example base unit of the multi-surface cart of FIGS. 1-3B in the wheels-up configuration according to various embodiments of the present disclosure.

DETAILED DESCRIPTION

The present disclosure relates to a multi-surface cart that can be modified to interface with different types of underlying surfaces. For example, a materials handling facility (e.g., sort center, delivery center, air cargo center, etc.) where items are transported between different stations in the facility may have different types of floor surfaces. A facility may have a generally planar floor surface, a floor surface that includes protruding roller-elements (e.g., ball bearings, cylindrical rollers, etc.), and/or other type of floor surfaces. A floor surface with roller-elements can be used to facilitate movement of heavy items safely and easily from one location to another location. According to various embodiments, the multi-surface cart of the present disclosure can be modified to allow movement along these different types of surfaces while transporting items between locations of the facility.

A cart is a vehicle used for carrying and transporting loads (e.g., items, packages, etc.). Typically, a cart includes wheels that interface with an underlying surface to allow movement of the cart along the underlying surface. While wheels positioned to interface with an underlying surface allow a cart to move along a generally planar surface, a cart in this configuration may be difficult to move along a surface comprising multiple roller elements (e.g., cylindrical rollers, ball bearings, etc.) as the protruding roller elements can impede the movement of the wheels along the surface.

According to various embodiments, the multi-surface cart of the present disclosure can be modified into two different configurations to allow the cart to interface with and be moveable along different surfaces. In a wheels-down configuration, wheels of the cart are positioned to extend at least in part below a base panel that forms an underlying surface of a base frame of the multi-surface cart to allow the wheels to directly interface with an underlying surface. In this configuration, the multi-surface cart can be moveable along a generally planar surface with the wheels. In a wheels-up configuration, the wheels of the cart are raised and positioned above the base panel of the cart such that the base panel interfaces with the underlying surface. In the wheels-up configuration, the multi-surface cart can be moveable along a surface including roller-elements with the base panel of the cart.

In the following discussion, a general description of a multi-surface cart and its components is provided, followed by a discussion of the operation of the same.

Figure 1:
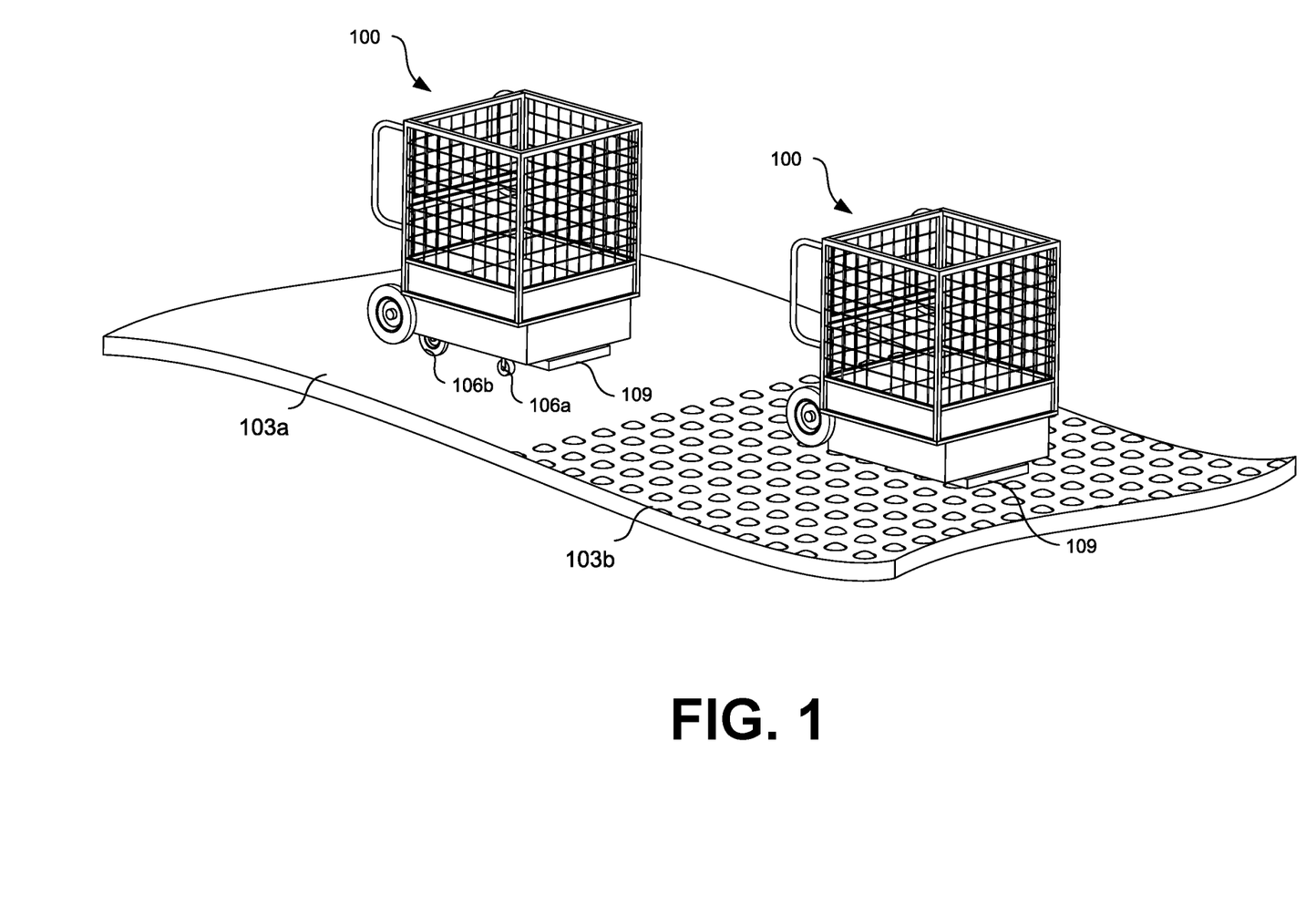
FIG. 1 is a scenario of an example multi-surface cart adjusted in a wheels-up configuration and a wheels-down configuration over different types of underlying surfaces according to various embodiments of the present disclosure.

FIG. 1 illustrates an example scenario that shows the cart 100 in the different configurations on different types of surfaces 103 (e.g., 103a, 103b). For example, the surfaces shown in FIG. 1 can correspond to surfaces 103 in a facility. A facility may be a sort center, shipping center, packing center, distribution center, or other shipping, handling, packing facility, or some other similar facilities. A package may be an article, a product, a flat, a box, and other suitable containers used for shipping items. As packages are processed, they are moved between various locations through the facility.

In the example of FIG. 1, the facility includes a generally planar surface 103a and a roller-element surface 103b (e.g., ball deck, roller deck, caster deck, ball mat, etc.). In some situations, a user may need to transport an item, package, or other type of load in a cart 100 from one location in the facility to another location in the facility. The path from the first location to the second location may require a user to maneuver the cart 100 along the different types of surfaces 103 in the facility. When the cart 100 is in the wheels-down configuration such that wheel assemblies 106 (e.g., 106a, 106b) extend below a base panel 109 of the cart 100, the cart 100 may be maneuvered by a user along the generally planar surface 103a with the wheels. When a user maneuvers the cart 100 along the generally planar surface 103a approaches a roller-element surface 103b, the user can transform the cart 100 to the wheels-up configuration to raise the wheel assemblies 106 above the base panel 109. This modification causes the base panel 109 to interface with and contact the roller-element surface 103b to allow movement of the cart 100 along the roller-element surface 103b with the base panel 109.

Similarly, when the user maneuvers the cart 100 and encounters the generally planer surface 103a, the user can transform the cart 100 to the wheels-down configuration, lowering the wheel assemblies 106 below the base panel 109 to allow movement along the generally planer surface 103a using the wheel assemblies 106.

As discussed in greater detail below, when the cart 100 is in the wheels-down configuration, the cart 100 can be modified to the wheels-up configuration by releasing a spring-actuated locking mechanism 112 (FIGS. 4A and 5A), which causes the wheel assemblies 106 of the cart 100 to raise. The wheel assemblies 106 can raise, in some cases, above the base panel 109 of the cart 100 to allow the base panel 109 to directly interface with and contact the underlying surface 103. Release of the spring-actuated locking mechanism 112 can occur in response to a depression of a release lever 115 (FIGS. 2A, 2B, 4A, 5A, 5B) of the locking mechanism 112.

When the cart 100 is in the wheels-up configuration, the cart 100 can be modified to the wheels-down configuration by actuation of a locking lever 118 (FIGS. 2B-5B). According to various embodiments, movement of the locking lever 118 in a downwards direction towards the underlying surface 103 causes the wheel assemblies 106 to lower and extend below the base panel 109, thereby returning the cart 100 to the wheels-down configuration. The force applied to the movement of the locking lever 118 translates to the force required to lower the wheel assemblies 106, effectively raising the base panel 109 and locking the base unit 203 in the wheels-down configuration as will be discussed in further detail below.

Figure 2A:
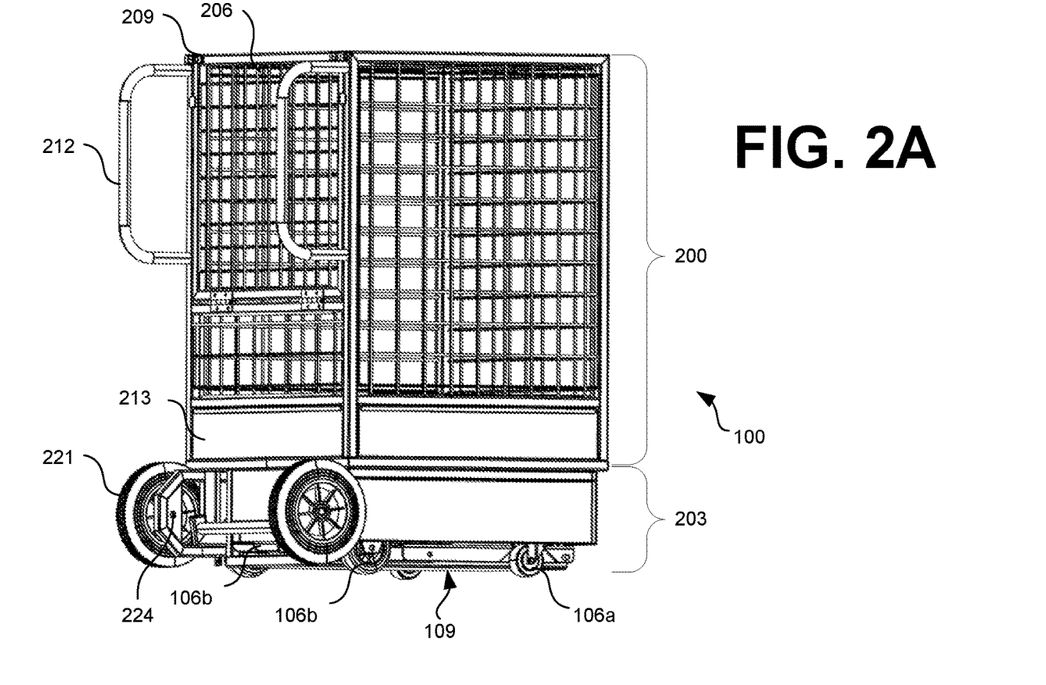
FIG. 2A illustrates a perspective view of the example multi-surface cart in a wheels-down configuration.
Figure 2B:
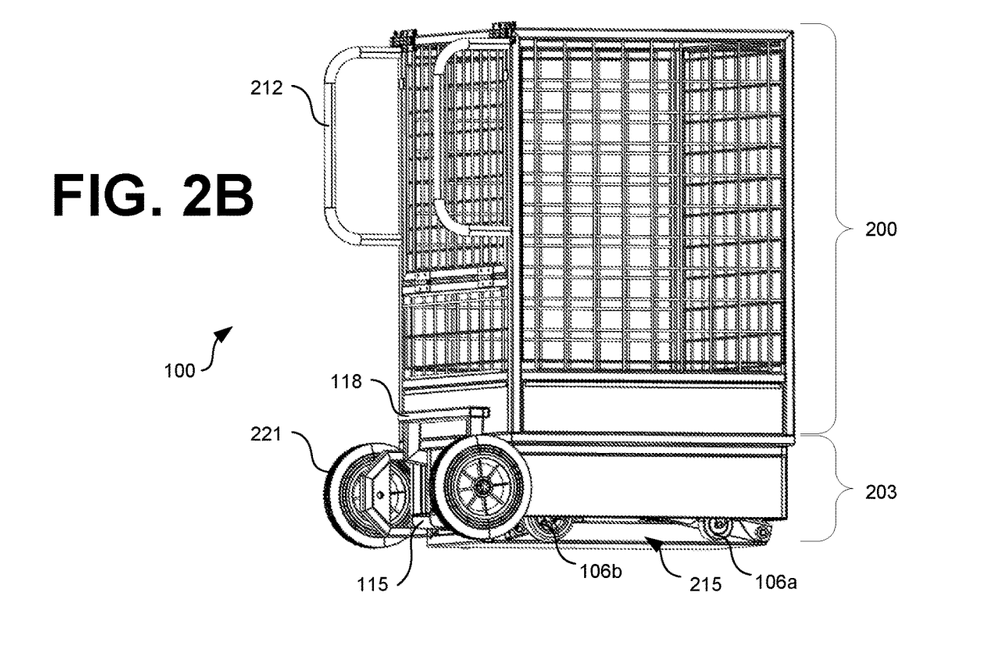
FIG. 2B illustrates a perspective view of the example multi-surface cart in a wheels-up configuration.

Turning now to FIGS. 2A and 2B, shown are perspective views of the example cart 100 in the different configurations according to various embodiments of the present disclosure. In particular, FIG. 2A illustrates an example of the cart 100 in the wheels-down configuration, and FIG. 2B illustrates an example of the cart 100 in the wheels-up configuration. According to various embodiments, the cart 100 includes a transport unit 200 and a base unit 203 extending from a bottom surface of the transport unit 200.

The transport unit 200 is configured to support a load that may be transported from one location to another using the cart 100. For example, the load can comprise one or more items, packages, or other types of loads. The transport unit 200 of FIGS. 2A-2B includes a basket comprising side walls defining an opening for placement of a load. In some embodiments, one or more side walls can include a door 206 that can open and close. The transport unit 200 can also include a latching mechanism 209 that is configured to secure the door 206 in a closed position and allow the door to pivot about a hinge to open and provide an access point into the opening of the transport unit 200. In some embodiments, the door can open and close along a vertical axis of the cart 100. In other embodiments, the door can open and close along a horizontal axis of the cart 100. In some embodiments, the transport unit 200 can include a lid (not shown). In various embodiments, the transport unit 200 may include one or more handles 212 coupled to a transport unit frame that can be used by a user to maneuver the cart 100.

Although the transport unit 200 of FIGS. 2A and 2B illustrates a basket comprising side walls defining an opening, the transport unit 200 can include a basket, a pallet, a platform, or other suitable type of transport structure for receiving a load and can be in any suitable size or form. In addition, although the side walls of the basket of FIGS. 2A and 2B are illustrated as a mesh structure, the side walls can be solid, mesh, clear, and/or other suitable structures or forms. Further, the transport unit 200 may comprise a pallet or other type of structure that lacks side walls.

In some examples, the transport unit 200 comprises a lower portion 213 that has a solid panel, as shown in FIGS. 2A and 2B. However, in other examples, the lower portion 213 can comprise a mesh structure, or other type of suitable structure. In some examples, the lower portion 213 or other structural components of the transport unit 200 can be configured to allow engagement with a forklift or other lifting mechanism as can be appreciated.

The components of the transport unit, including the basket, side walls, handles 212, door 206, lower portion 213, and other components, can be formed from metal, plastic, and/or other suitable types of materials.

The base unit 203 of the cart 100 extends from a bottom surface of the transport unit 200. The base unit 203 is configured to interface with a number of different types of underlying surfaces, such as the surfaces 103a and 103b shown in FIG. 1, to allow movement of the cart 100 along the different surfaces. As shown in FIG. 2A, the base unit 203 is configured in the wheels-down configuration such that the wheel assemblies 106 (e.g., 106a, 106b) extend below the base panel 109, which forms the underlying surface of a base frame 215 (FIGS. 2B-5B) of the base unit 203. FIG. 2B illustrates the cart 100 in the wheels-up configuration according to various embodiments. As shown in FIG. 2B, the wheel assemblies 106 are raised and positioned above the base panel 109 to allow the base panel 109 to interface with an underlying floor surface 103.

The base frame 215 may comprise vertical support beams 216 (FIG. 3A) extending between an upper frame portion 218 (FIG. 3A) and a lower frame portion 220 (FIG. 3B) of the base frame 215. In some embodiments, the vertical support beams 216 may be directly or indirectly coupled to a bottom surface of the transport unit 200.

In some embodiments, the components of the support structure of the base unit 203 (e.g., the base frame 215, the support beams 216, the surface adjustment assembly 306 (FIG. 3A-3B), etc.), that directly or indirectly engage with the transport unit 200 to support the transport unit 200 can be modified to include alternative configurations including, e.g., tines and forks that can engage with a pallet or other type of structure.

In some embodiments, the wheel assemblies 106 can comprise fixed casters, swivel casters, or other type of wheel assemblies. For example, a fixed caster comprises a wheel mounted to a fixed housing at a fixed orientation. A fixed caster limits movement to forward and backwards directions. A swivel caster comprises a wheel mounted to a housing that allows for rotation of the caster while under load. In some examples, all of the wheel assemblies 106 comprise the same type of wheel assembly. In other examples, a front set of wheel assemblies 106a can differ from a rear set of wheel assemblies 106b. According to various embodiments, each of the wheel assemblies 106 can differ in type (e.g., fixed vs. swivel), diameter, material (e.g., rigid rubber, plastic, metal, etc.), and/or other characteristics as can be appreciated.

In some embodiments, the base unit 203 may comprise an additional set of wheels 221 affixed to and extending from a fixed axle 224 of the base unit 203. The wheels 221 can be designed to aid in pulling the cart 100 over obstacles such as, for example, curbs, or other objects that may impede movement of the cart 100. For example, when the handle(s) 212 is depressed, the front end of the cart 100 may lift causing the weight of the cart 100 and load within the cart 100 to transfer to the wheels 221. According to various embodiments, the wheels 221 may be sized larger than the wheels of the wheel assemblies 106 to support the weight of the cart 100 and any loads that may be placed in the cart 100 while pulling the cart 100 over obstacles. The wheels 221 may comprise pneumatic wheels, semi-pneumatic wheels, or other type of wheels as can be appreciated.

Although the additional set of wheels 221 are shown as being positioned at the rear of the cart 100 along a long axis of the cart 100, in some embodiments, the positioning of the wheels can be reversed such that the wheels are positioned on at a side of the cart along a short axis of the cart 100. Further, in some embodiments, the wheels 221 can be configured such that the cart 100 can be moveable in the same direction regardless of whether the wheels 221 are positioned along the long axis or the short axis. In other embodiments, the cart 100 may be moveable in different directions according to the positioning of the wheels 221.

Figure 3A:
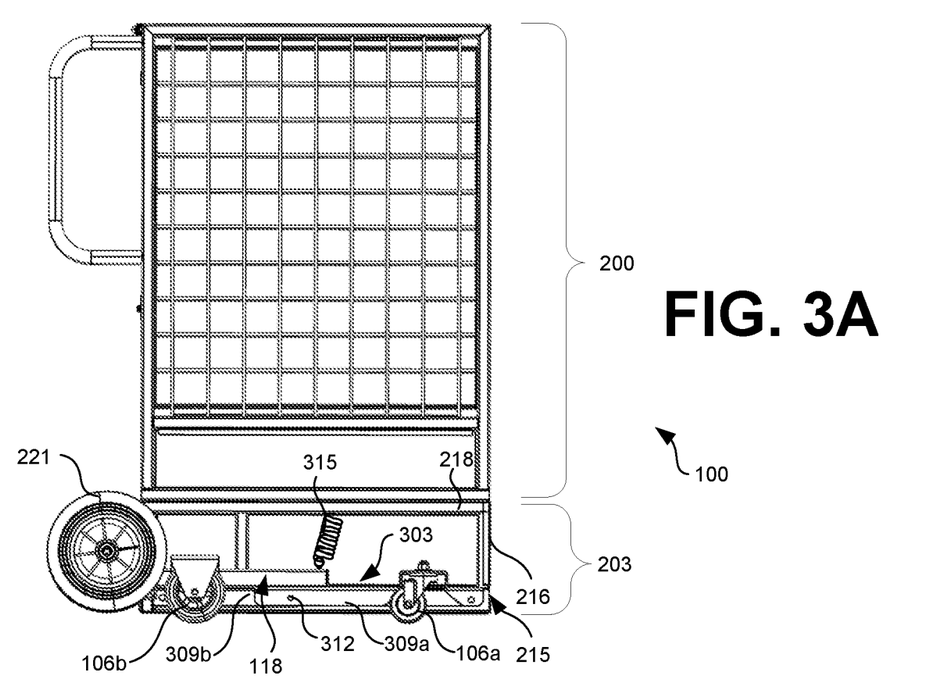
FIG. 3A illustrates a perspective view of the example multi-surface cart in a wheels-down configuration.
Figure 3B:
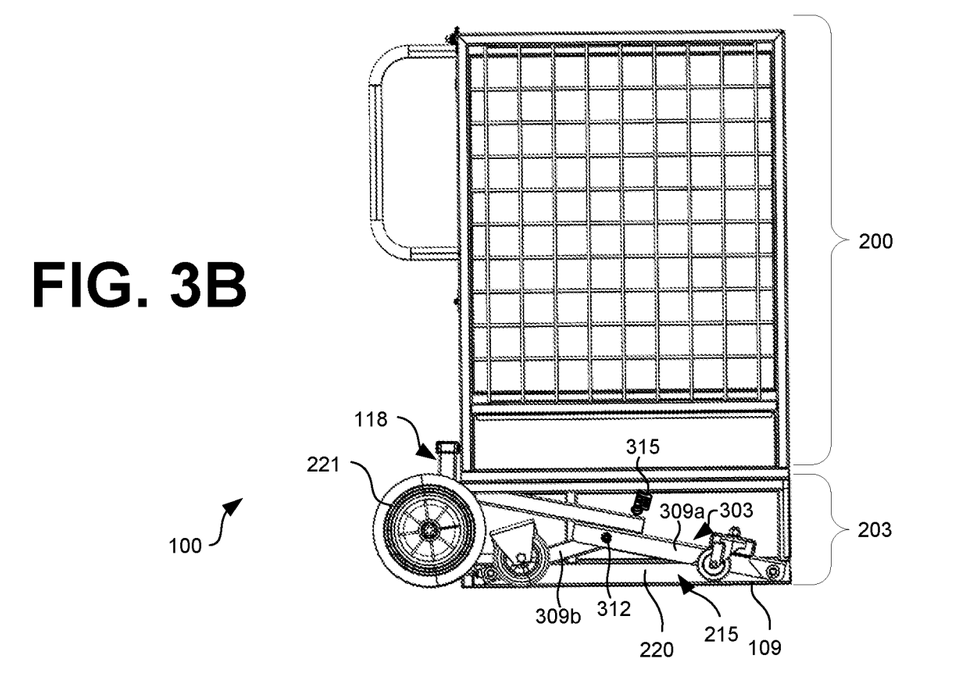
FIG. 3B illustrates a perspective view of the example multi-surface cart in a wheels-up configuration.
Figure 4A:
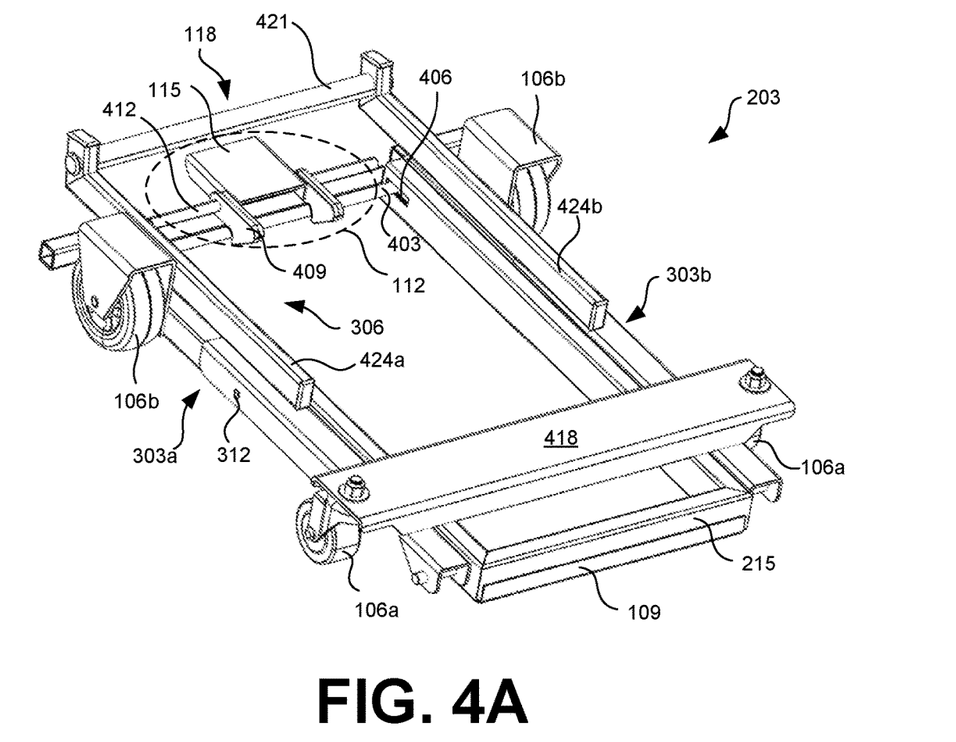
FIG. 4A illustrates a perspective view of the example base unit in a wheels-down configuration.
Figure 5A:
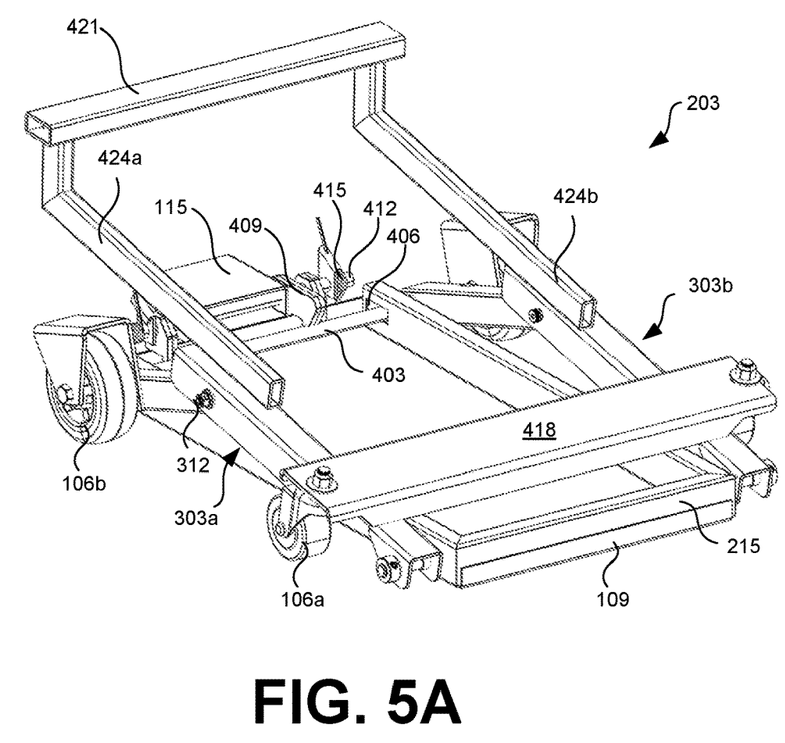
FIG. 5A illustrates a perspective view of the example base unit in a wheels-up configuration.

Turning now to FIGS. 3A-3B, shown are side views of the cart 100 in the different configurations according to various embodiments. In particular, FIG. 3A illustrates an example side view of the cart 100 in the wheels-down configuration, and FIG. 3B illustrates an example side view of the cart 100 in the wheels-up configuration. As shown in FIGS. 3A and 3B, the wheel assemblies 106 are affixed to a hinged arm 303 of a surface adjustment assembly 306 (FIGS. 4A, 5A).

The hinged arm 303 shown in FIGS. 3A and 3B represents one hinged arm 303 of a pair of hinged arms 303a, 303b (FIGS. 4A and 5A) that are laterally spaced and positioned generally parallel to one another. Each hinged arm 303 may comprise two arm members 309 (e.g., 309a, 309b) that are joined with one another at a hinge joint 312 to allow the two arm members 309 to pivot with respect to each other at the hinge joint 312. The hinged arms 303 can be formed from metal, plastic, or other suitable materials.

When the cart 100 is in the wheels-down configuration, the hinged arm 303 is generally straight, as shown in FIG. 3A. When the cart 100 is in the wheels-up configuration, the hinged arm 303 is bent at the hinge joint 312 such that a first member 309a is positioned at an angle relative to the second arm member 309a, as shown in FIG. 3B. The surface adjustment assembly 306 is configured to drive a bending or straightening movement of the hinged arms 303. As the wheel assemblies 106 are affixed to the hinged arms 303, movement of the hinged arms 303 drives a raising or a lowering movement of the wheel assemblies 106.

In addition, as shown in FIGS. 3A and 3B, the base unit 203 may comprise spring assemblies 315 that extend between the upper frame portion 220 of the base frame 215 or bottom of the load unit 200 and respective lever arms 424 (FIGS. 4A and 4B) of the locking lever 118 coupled to the pair of hinged arms 303. The spring assemblies 315 can be provided as an additional counter force to the force associated with the movement of the hinged arms 303 when modifying between the different configurations. For example, as shown in FIG. 3A, the spring assembly 315 is extended while the hinged arms 303 are in a generally straight configuration. When the hinged arms 303 bend and the wheel assemblies 106 are raised, the spring assembly 315 compresses to counter the force driving the bending movement of the hinged arms 303 to the wheels-up configuration.

Likewise, when the cart 100 is modified back to the wheels-down configuration, the spring assembly 315 expands between the bottom of the load unit 200 or upper frame portion 220 of the base frame 215 and the locking lever 118 coupled to the pair of hinged arms 303. The spring assembly 315 can be designed to minimize the impact to the components that may occur while transitioning between the configurations due to the weight of the transport unit 203 and any items included in the transport unit 203.

It should further be noted that while the surface adjustment assembly 306 and locking lever 118 are illustrated in FIGS. 3A and 3B as being arranged such that the locking lever 118 and release lever 115 extend from the rear side of the cart 100, the configuration of the surface adjustment assembly 306 and locking lever 118 can be arranged along any side of the cart 100 as can be appreciated. For example, the locking lever 118 and release leaver 115 may extend from a side of the cart 100 along a short axis of the cart 100 instead of the long axis of the cart 100.

Figure 4B:
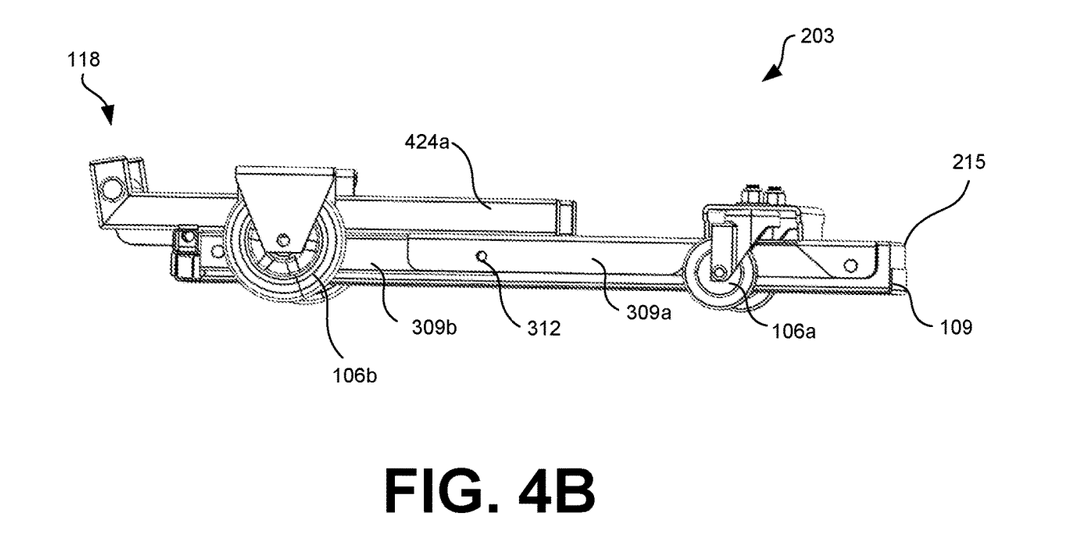
FIG. 4B illustrates a side view of the example base unit in a wheels-down configuration.

Turning now to FIGS. 4A and 4B, shown are example views of a portion of the base unit 203, including the surface adjustment assembly 306 in the wheels-down configuration according to various embodiments of the present disclosure. FIG. 4A illustrates an example of a perspective view of the base unit 203 with the surface adjustment assembly 306 in the wheels-down configuration, and FIG. 4B illustrates a side view of the base unit 203 with the surface adjustment assembly 306 in the wheels-down configuration. The portion of the base unit 203 illustrated in FIGS. 4A and 4B includes a base frame 215, the surface adjustment assembly 306 coupled to and supported by the base frame 215, a plurality of wheel assemblies 106 (e.g., 106a, 106b) affixed to and supported by the surface adjustment assembly 306, and a base panel 109 that forms an underlying surface of the base frame 215.

The base frame 215 provides a structural frame for supporting various components of the base unit 203 including the surface adjustment assembly 306. As shown in FIG. 4A, the base frame 215 may comprise a rectangular frame. However, the frame is not limited to being a rectangular frame and can be of any shape or form as can be appreciated. Although not shown in FIG. 4A or 4B, the base frame 215 may comprise vertical support beams 216 extending between an upper frame portion 218 and a lower frame portion 220 of the base frame 215. The vertical support beams 216 may be directly or indirectly coupled to a bottom surface of the transport unit 200.

The surface adjustment assembly 306 includes the pair of hinged arms 303 (e.g., 303a, 303b) laterally spaced from and substantially parallel to one another, a sliding element 403 coupled to the pair of hinged arms 303 (e.g., 303a, 303b), a locking mechanism 112 (denoted by the dotted circular line), and a locking lever 118 coupled to the pair of hinged arms 303. Each hinged arm 303 comprises two arm members 309 (e.g., 309a, 309b) that are joined at a hinge joint 312 such that the two arm members 309 can pivot with respect to each other at the hinge joint 312, causing the hinged arms 303 to straighten or bend relative to the hinge joint 312.

The sliding element 403 extends between and perpendicular to the pair of hinged arms 303 in an arrangement where a first end of the sliding element 403 is coupled to the arm member 309b of the first hinged arm 303a and a second end of the sliding element 403 is coupled to the arm member 309b of the second hinged arm 303b. The sliding element 403 can comprise a bar, rod or other type of element as can be appreciated. The sliding element 403 can be formed from metal, plastic, or other suitable materials.

Each hinged arm 303 may be positioned along an opposing outer side surface of the base frame 215. The base frame 215 can include opposing guiding slots 406 disposed within opposing sides of the base frame 215. The guiding slots 406 each extend from an outer surface of the base frame 215 to an inner surface of the base frame 215. According to various embodiments, the sliding element 403 extends through each of the opposing guiding slots 406. The opposing guiding slots 406 are sized to allow movement of the sliding element 403 within the guiding slots 406 in a forward and backward direction relative to a longitudinal axis of the frame 215. An amount of movement of the sliding element 403 along a length of the guiding slots 406 can be controlled by a length of each guiding slot 406. For example, the sliding element 403 can move in a forwards direction along a length of the guiding slots 406 until the sliding element 403 abuts with first ends or edges of the guiding slots 406. Similarly, the sliding element 403 can move in a backwards direction along the length of the guiding slots 406 until the sliding element 403 abuts with second ends or edges of the guiding slots 406.

The sliding element 403 is coupled to the pair of hinged arms 303 such that a forward or backward movement of the sliding element 403 along the length of the guiding slots 406 causes the respective arms members 309a, 309b of the hinged arms 303 to pivot with respect to each other at the respective hinge joint 312. For example, linear movement of the sliding element 403 along a length of the guiding slots 406 in a forwards direction away from the locking mechanism 112 causes the hinged joints 312 of the hinged arms 303 to move in the forward direction and upwards direction, such that the arm members 309 of the hinged arms 303 are oriented relative to one another at an angle less than 180 degrees. Similarly, movement of the sliding element 403 in a backwards direction towards the locking mechanism 112 along the length of the guiding slots 406 drives vertical movement of the hinged joints 312 in a downwards direction towards the base frame 215. This results in a straightening of the hinged arms 303 at the hinged joint 312, such that the arm members 309 of the hinged arms are oriented relative to one another in a substantially straight configuration.

In the wheels-down configuration of FIGS. 4A-4B, the sliding element 403 is fixed in a first position by the locking mechanism 112. The locking mechanism 112 comprises a release lever 115 and locking component 409 coupled to a rod element 412 positioned parallel to the sliding element 403. The locking component 409 extends from the rod element 412 and is configured to engage with the sliding element 403 and restrict movement of the sliding element 403 along or within the guiding slots 406. Although FIG. 4A illustrates two locking components 409, the locking mechanism 112 may include one or more locking components 409. The locking component 409 may comprise a bracket, a hook, or other type of attachment means configured to engage with and detach from the sliding element 403.

The release lever 115 is coupled to the rod element 412 such that depression of the release lever 115 drives a counter-clockwise rotation of the rod element 412 along a rotational axis of the rod element 412. The counter-clockwise rotation of the rod element 412 drives a counter-clockwise rotation of the locking components 409, raising the locking component 409 away from the sliding element 403. As the locking component 409 raises, the locking component 409 can release and become disengaged from the sliding element 403. Due to the weight of the cart 100, disengagement of the locking component 409 from the sliding element 403 results in forward movement of the sliding element 403 away from the locking mechanism 112 along the length of the guiding slots 406. The sliding element 403 may move in the forward direction until the sliding element 403 abuts with an end of the guiding slots 406 or until the base panel 109 contacts an underlying surface. As previously discussed, the spring assembly 315 can be designed to counter the force associated with the movement of the sliding element 403 and raising of the hinged arms 303 in order to minimize the impact to the components of the cart 100 during the transition from the wheels-down configuration to the wheels-up configuration. As shown in FIG. 3B, the spring assembly 315 compresses as the hinged arms 303 bend and the wheel assemblies 106 are raised.

The release lever 115 may comprise a foot lever, a hand-actuated lever, or other type of lever. Although the release lever 115 is shown as a rectangular plate corresponding to a foot lever, the release lever 115 can be of any suitable size and shape such that actuation of the release lever 115 can cause a rotation of the rod element 412 and allow disengagement of the locking component 409 from the sliding element 403.

For example, the release lever 115 can comprise arms (not shown) that extend vertically in an upwards direction relative to the rod element 412. The arms can be positioned generally perpendicular to and coupled to a structure (e.g., plate) that is coupled to the rod element 412. A user can pull the arms of the release lever 115 towards his or her body to cause rotation of the rod element 412, resulting in a disengagement of the locking component 409 from the sliding element 403. In some embodiments, the weight of the load in the transport unit 200 may contribute to the force required to lower the base panel 109 and raise the wheel assemblies 106 when modifying the cart 100 from the wheels-down configuration shown in FIGS. 4A and 4B to the wheels-up configuration shown in FIGS. 5A and 5B.

According to various embodiments, the locking mechanism 112 may be spring actuated. For example, the locking mechanism 112 may comprise one or more spring components 415 (FIG. 5A-5B) positioned about the rod element 412 that bias the release lever 115 and the rotation of the rod element 412 following depression of the release lever 115 such that the release lever 115, rod element 412, and locking component 409 return to the same orientation prior to depression of the release lever 115. In particular, the locking component 409 returns to the original orientation to allow reengagement with the sliding element 403 when the sliding element 403 is pushed in a backwards direction along the guided slots 406 towards the locking component 409.

In some embodiments, the locking component 409 can comprise a ratcheting mechanism instead of or in addition to the spring components 415. The ratcheting mechanism can be configured to control the movement of the sliding element 403 in multiple static positions during the transition between the different configurations. In some configurations, the release lever 115 can be connected to or otherwise engage with the sliding element 409 such that depression of the release lever 115 causes the sliding element 409 to move in a forwards direction along the guided slots 406 away from the locking component 409 and pulling of the release lever 115 in an upwards orientation causes the sliding element 409 to move in a backwards direction along the guided slots 406 towards the locking component 409.

According to various embodiments, the wheel assemblies 106 are coupled to pair of hinged arms 303 of the surface adjustment assembly 306 such that movement of the pair of hinged arms 303 about the hinged joint 312 causes the wheel assemblies 106 to raise and/or lower relative to the base frame 215. In some examples, the wheel assemblies 106 can be positioned about the base unit 203 to provide balance and support of the cart 100 for movement along an underlying surface 103 when the cart 100 is in the wheels-down configuration. In FIG. 4A, the portion of the base unit 203 illustrated includes four wheel assemblies 106 comprising a first set of laterally spaced wheel assemblies 106a positioned towards a front end of the base unit 203 and a second set of laterally spaced wheel assemblies 106b positioned towards a rear end of the base unit 203. It should be noted that the base unit 203 is not limited to four wheel assemblies 106 and the base unit 203 may comprise more or less than four wheel assemblies 106 as can be appreciated.

In FIG. 4A, the first set of wheel assemblies 106 are coupled to an assembly plate 418 that extends across a front region of the base unit 203 perpendicular to the pair of hinged arms. The assembly plate 418 is attached to each of the hinged arms 303, such that a first end of the assembly plate 418 is attached to a first hinged arm 303a and a second end of the assembly plate 418 is attached to a second hinged arm 303b. The second set of wheel assemblies 106b are individually coupled to the arm members 309a. It should be noted that attachment of the wheel assemblies 106 to the hinged arms 303 is not limited to the configurations shown in FIG. 4A and that the wheel assemblies 106 can be attached to the hinged arms 303 in other configurations as can be appreciated. For example, the wheel assemblies 106 may be directly coupled to the hinged arms 303, indirectly coupled to the hinged arms 303 via an assembly plate 418 or other suitable components, and/or attached in other configurations as can be appreciated.

The surface adjustment assembly 306 may further comprise a locking lever 118 coupled to the pair of hinged arms 303. The locking lever 118 comprises a lever rod 421 coupled to and extending between a pair of lever arms 424 (e.g., 424a, 424b) that are laterally spaced and parallel to one another. Each lever arm 424 is attached to a respective hinged arm 303 of the pair of hinged arms 303. When the surface adjustment assembly 306 is in wheels-down configuration, as shown in FIG. 4A, each lever arm 424 is oriented generally parallel to both a top surface of the base frame 215 and the respective hinged arm 303 to which the lever arm is attached.

Figure 5B:
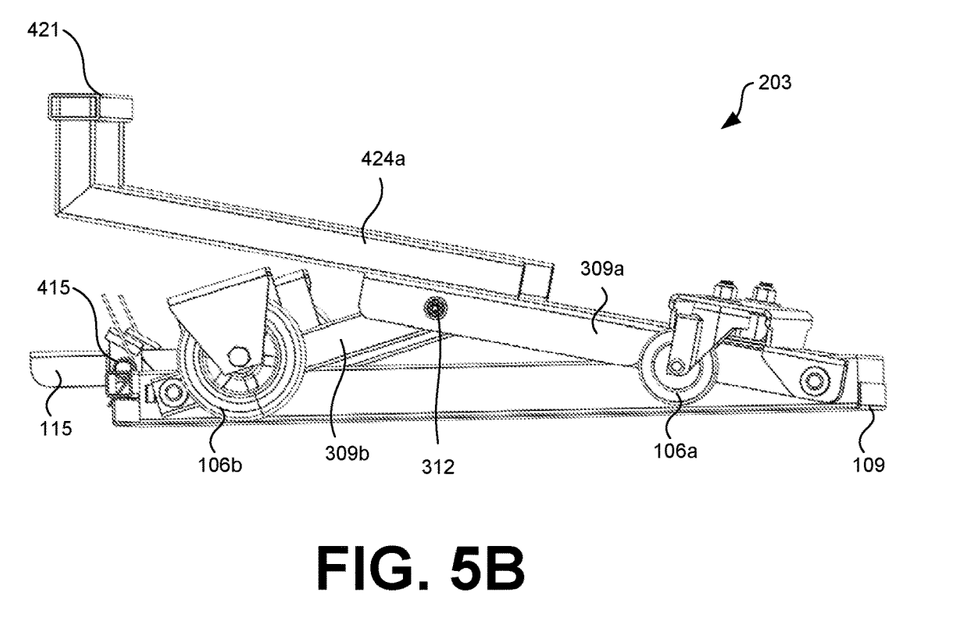
FIG. 5B illustrates a side view of the example base unit in a wheels-up configuration.

FIGS. 5A and 5B illustrate example views of the portion of the base unit 203 of FIGS. 4A and 4B in the wheels-up configuration according to various embodiments of the present disclosure. In particular, FIG. 5A illustrates a perspective view of the portion of the base unit 203, and FIG. 5B illustrates an example side view of the portion of the base unit 203. When the surface adjustment assembly 306 is in the wheels-up configuration, as shown in FIGS. 5A and 5B, the hinged arm 303 is bent such that the first arm member 309a is orientated at a first angle relative to the second arm member 309b. The locking lever 118 is attached to the hinged arms 303 such that, when the surface adjustment assembly 306 is in the wheels-up configuration, the lever rod 421 is raised in an upward direction and each lever arm 424 is oriented at a second angle relative to the second arm member 309b of the respective hinged arm 303 and generally parallel to the first arm member 309a of the respective hinged arm 303.

The surface adjustment assembly 306 is configured such that a depression of the lever rod 421 of the locking lever 118 drives movement of the hinge joint 312 of the hinged arms 303 in a downward direction causing the arm members 309 of the hinged arms 303 to pivot with respect to each other at the hinge joint 312 towards a straightened configuration. The downward movement of the hinge joint 312 causes the wheel assemblies 106 coupled to the hinged arms 303 to be lowered and extend below the base panel 109 of the base frame 215.

As the hinged arms 303 straighten as a result of the force applied to the locking lever 118, the sliding element 403 extending between the hinged arms 303 moves in a rearward direction along the guided slots 406 towards the locking mechanism 112. As the sliding element 403 approaches the locking mechanism 112, the locking component 409 engages with the sliding element 403 to fix the position of the sliding element 403 along the horizontal length of the guiding slots 406. Upon engagement of the locking component 409 with the sliding element 403, the surface adjustment assembly 306 is configured in the wheels-down configuration. As the hinged arms 303 straighten, the spring assemblies 315 extend while providing a counter force to reduce the impact of the cart components associated with the transition between the different configurations.

Figure 6:
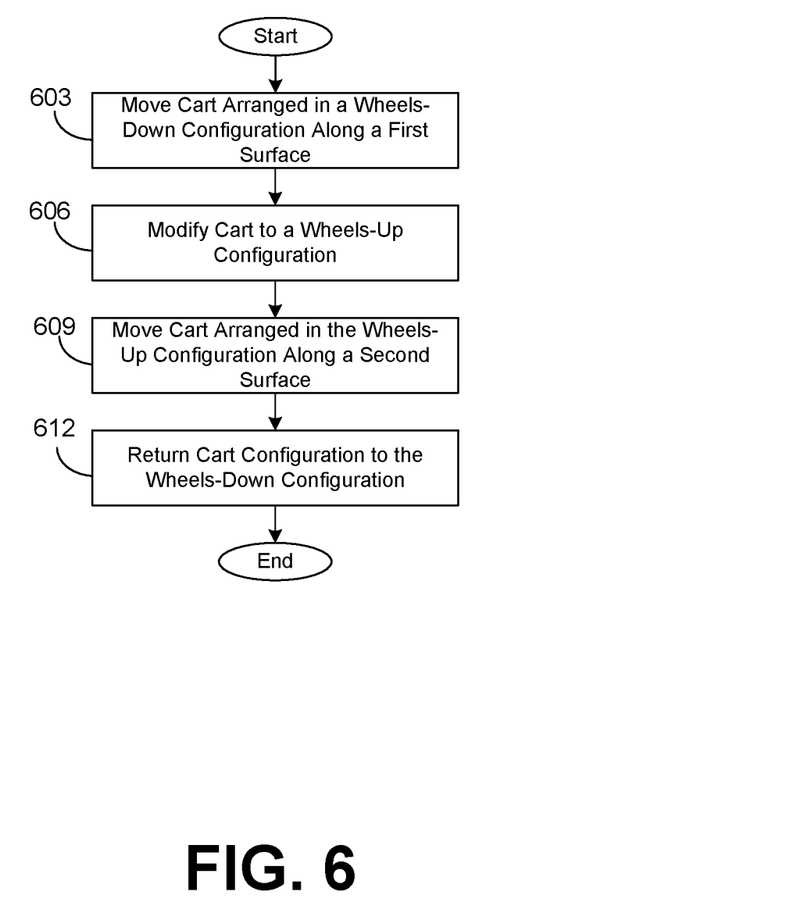
FIG. 6 is a flowchart depicting modification of the multi-surface cart of FIGS. 1-3B between the wheels-down configuration and the wheels-up configuration according to various embodiments of the present disclosure.

Turning now to FIG. 6, shown is an example of a flowchart illustrating one example of the operation of the use of the multi-surface cart 100 according to various embodiments of the present disclosure. It is understood that the flowchart of FIG. 8 provides merely an example of the many different types of functional arrangements that may be employed while using the multi-surface cart 100.

At step 603, a user can maneuver a cart 100 that is configured in the wheels-down configuration along a first surface 103. As previously discussed, when the cart 100 is in the wheels-down configuration, the wheel assemblies 106 extend below to the base panel 109 forming the underlying surface of the base frame 215 to allow movement of the cart 100 along the first surface 103 with the wheels of the wheel assemblies 106. According to various embodiments, the first surface 103 may comprises a generally planar surface or other suitable surface for movement of the cart 100 with the wheels.

At step 606, a user can modify the cart 100 to a wheels-up configuration. To modify the cart 100 to the wheels-up configuration, a release lever 115 of a locking mechanism 112 of the surface adjustment assembly 306 is actuated. In some embodiments, the release lever 115 comprises a foot lever that may be actuated by a user stepping down on the release lever 115. In other embodiments, the release lever 115 may be actuated by a user pulling the release lever towards his or her body and away from the base unit 203 of the cart 100. Actuation or depression of the release lever 115 causes a counter-clockwise rotation of the rod element 412 which drives a counter-clockwise rotation of the locking component 409 thereby raising the locking component 409 in an upwards direction. Raising of the locking component 409 in turn causes disengagement of the locking component 409 from the sliding element 403. The spring components 415 bias the release lever 115 and the rotation of the rod element 412 following depression of the release lever 115 to allow the release lever 115, rod element 412, and locking component 409 to return to the original orientation prior to depression of the release lever 115.

Disengagement of the locking component 409 from the sliding element 403 causes a linear movement in a forward direction of the sliding element 403 along the length of the guiding slots 406 and away from the locking mechanism 112. Since the sliding element 403 is coupled to the hinged arms 303, movement of the sliding element 403 in the forward direction drives movement of the hinged arms 303 such that the hinge joint 312 moves in the forward direction and in an upwards direction. The movement of the hinge joint 312 corresponds to the arm members 309 of each hinged arm 303 pivoting with respect to one another at the hinge joint 312.

When the pair of hinged arms bend at the hinge joint 312, the wheel assemblies 106 are raised since the wheel assemblies 106 are affixed to the hinged arms 303. As the wheel assemblies 106 are raised, the base panel 109 drops until the base panel 109 interfaces with the underlying surface 103. Once the wheel assemblies are raised above the base panel 109 to allow the base panel 109 to interface with the underlying surface 103, the cart 100 is configured in the wheels-up configuration.

In step 609, the user maneuvers the cart 100 that is arranged in the wheels-up configuration along a second surface 103 with the base panel 109 of the base unit 203 of the cart. The wheel assemblies 106 are raised above the base panel 109 such that the wheel assemblies 106 no longer interface with the underlying surface 103. The second surface 103 may comprise a roller-element surface comprising cylindrical rollers, ball bearings, or other suitable structure protruding from the surface to facilitate movement of the cart 100 along the second surface 103 with the base panel 109.

In step 612, the cart 100 is modified to the wheels-down configuration. Modification of the cart 100 to the wheels-down configuration requires an actuation of a locking lever 118. A user may actuate the locking lever 118 by pushing downward on the locking lever 118 towards the underlying surface 103. The force caused by pushing the locking lever 118 in a downwards direction drives a downward movement of the hinge joint 312 thereby causing the arm members 309 to pivot with respect to each other at the hinge joint 312 towards a straightened configuration.

The movement of the hinged arms 303 with respect to the movement of the locking lever 118 drives the sliding element 403 in a backwards direction along the length of the guiding slots 406 towards the locking mechanism 112. As the sliding element 403 engages with the locking component 409 of the locking mechanism 112, the locking component 409 can raise and become attached to the sliding element 403 to lock the sliding element 403 in a fixed position. The surface adjustment assembly 306 is configured such that when the sliding element 403 is engaged with the locking component 409, the wheel assemblies 106 coupled to the hinged arms 303 are lowered and extend below the base panel 109 of the base frame 215 and interface with the underlying surface 103. Once the sliding element 403 is fixed in position and the hinged arms 303 are substantially linear relative to one another, the cart 100 is considered to be in the wheels-down configuration.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The term "substantially" is meant to permit deviations from the descriptive term that don't negatively impact the intended purpose. Descriptive terms are implicitly understood to be modified by the word substantially, even if the term is not explicitly modified by the word substantially.

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A multi-surface cart, comprising:
a transport unit configured to support a load; and
a base unit extending below a bottom surface of the transport unit, the base unit being configured to be adjustable between a first configuration and a second configuration, the base unit comprising a surface adjustment assembly coupled to a base frame of the base unit, a plurality of wheels coupled to the surface adjustment assembly, and a base panel that forms an underlying surface of the base frame below the transport unit, the surface adjustment assembly comprising:
a pair of hinged arms laterally spaced, each hinged arm being coupled to the base frame at a respective opposing outer side of the base frame, and each hinged arm comprising two members joined at a hinge joint;
a sliding member coupled to the pair of hinged arms, the sliding member extending between and being perpendicular to the pair of hinged arms;
a lever coupled to the pair of hinged arms to pivot the two members of each hinged arm with respect to each other at the hinge joint, movement of the lever driving the hinge joints of the pair of hinged arms to move the sliding member in a first direction; and
a locking mechanism to secure the sliding member in the first configuration and release the sliding member for the second configuration, a release of the locking mechanism permitting movement of the sliding member in a second direction.

2. The multi-surface cart of claim 1, wherein the first configuration comprises the plurality of wheels being positioned to extend at least in part below the underlying surface of the base frame to allow movement of the multi-surface cart using the plurality of wheels.

3. The multi-surface cart of claim 1, wherein the second configuration comprises the plurality of wheels being raised and positioned above the underlying surface of the base frame for movement of the multi-surface cart on the underlying surface of the base frame.

4. The multi-surface cart of claim 1, wherein the plurality of wheels comprises a first plurality of wheels, and the base unit further comprises a second plurality of wheels affixed to and extending from a fixed axle of the base unit.

5. A cart, comprising:
a transport unit; and
an adjustable base unit extending below a bottom surface of the transport unit, the adjustable base unit comprising a surface adjustment assembly configured to modify a configuration of the base unit such that the cart is movable along a first surface in a first configuration with a plurality of wheels on the first surface and is moveable along a second surface in a second configuration with an underlying surface of the adjustable base unit on the second surface, wherein the surface adjustment assembly comprises:
a pair of hinged arms laterally spaced and substantially parallel to one another, each hinged arm comprising two members coupled at a hinge joint;
a sliding member coupled to the pair of hinged arms, the sliding member extending perpendicular to and between the pair of hinged arms at a first end, and
a locking mechanism to secure the sliding member in the first configuration and release the sliding member for the second configuration.

6. The cart of claim 5, wherein the adjustable base unit further comprises:
a base frame, the surface adjustment assembly being coupled to the base frame;
the plurality of wheels; and
a base panel disposed along a bottom surface of the base frame that forms the underlying surface.

7. The cart of claim 6, wherein the first configuration comprises the plurality of wheels being positioned at least in part below the base panel to allow movement of the cart along the first surface with the plurality of wheels on the first surface.

8. The cart of claim 6, wherein the second configuration comprises the plurality of wheels being raised and positioned above the base panel.

9. The cart of claim 5, wherein detachment of the locking mechanism from the sliding member permits movement of the sliding member in a first direction and movement of the hinge joints of the pair of laterally spaced hinged arms in a second direction causing the plurality of wheels to be raised and positioned above a base panel that forms the underlying surface of the adjustable base unit.

10. The cart of claim 5, wherein the locking mechanism comprises a first lever, and the surface adjustment assembly comprises a second lever coupled to the pair of hinged arms, movement of the first lever causing the cart to transition from the first configuration to the second configuration, and movement of the second lever causing the cart to transition from the second configuration to the first configuration.

11. The cart of claim 5, wherein the first surface comprises a generally planar surface and the second surface comprises a plurality of roller elements.

12. The cart of claim 5, wherein the transport unit comprises a plurality of side walls that define a space for placement of a load.

13. The cart of claim 5, further comprising a handle coupled to the transport unit.

14. A method, comprising:
moving a multi-surface cart along a first surface in a first configuration with a plurality of wheels of the multi-surface cart on the first surface, the multi-surface unit comprising a transport unit and an adjustable base unit extending below a bottom surface of the transport unit, the adjustable base unit comprising a surface adjustment assembly configured to modify a configuration of the base unit such that the cart is movable along the first surface in the first configuration with the plurality of wheels on the first surface and is moveable along a second surface in a second configuration with an underlying surface of the adjustable base unit on the second surface;
actuating a lever of the multi-surface cart to modify the multi-surface cart from the first configuration to the second configuration; and
moving the multi-surface cart along the second surface in the second configuration with the underlying surface of adjustable based unit of the multi-surface cart on the second surface,
wherein the surface adjustment assembly comprises:
a pair of hinged arms laterally spaced and substantially parallel to one another, each hinged arm comprising two members coupled at a hinge joint;
a sliding member coupled to the pair of hinged arms, the sliding member extending perpendicular to and between the pair of hinged arms at a first end, and
a locking mechanism to secure the sliding member in the first configuration and release the sliding member for the second configuration.

15. The method of claim 14, further comprising modifying the multi-surface cart from the second configuration to the first configuration.

16. The method of claim 15, wherein the base unit comprises the plurality of wheels, a base frame, and a base panel that forms the underlying surface.

17. The method of claim 16, wherein, in the first configuration, at least a portion of each of the plurality of wheels is positioned below the base panel to allow the plurality of wheels to engage with the first surface.

18. The method of claim 16, wherein, in the second configuration, the plurality of wheels are raised above the base panel to allow the base panel to engage with the second surface.

19. The method of claim 14, wherein actuating the lever comprises stepping on the lever.

20. The method of claim 14, wherein actuating the lever comprises pulling the lever in a direction away from the multi-surface cart.

* * * * *